United States Patent
Bourakov et al.

(10) Patent No.: US 8,417,803 B2
(45) Date of Patent: Apr. 9, 2013

(54) INTERFACING BETWEEN A COMMAND LINE INTERFACE-BASED APPLICATION PROGRAM AND A REMOTE NETWORK DEVICE

(75) Inventors: Veniamin Bourakov, Carmel, CA (US); Jenny Z. Li, Santa Clara, CA (US); Lieman Soewito, San Jose, CA (US); Amit Subhash Mokal, San Francisco, CA (US)

(73) Assignee: Rockstar Consortium US LP, Richardson, TX (US)

( * ) Notice: Subject to any disclaimer, the term of this patent is extended or adjusted under 35 U.S.C. 154(b) by 0 days.

(21) Appl. No.: 13/449,143

(22) Filed: Apr. 17, 2012

(65) Prior Publication Data

US 2012/0265864 A1  Oct. 18, 2012

Related U.S. Application Data

(63) Continuation of application No. 12/732,043, filed on Mar. 25, 2010, now Pat. No. 8,161,140, which is a continuation of application No. 11/265,759, filed on Nov. 2, 2005, now Pat. No. 7,707,269.

(51) Int. Cl.
*G06F 15/177* (2006.01)
(52) U.S. Cl. ............................ 709/220; 709/238
(58) Field of Classification Search ........... 709/220, 709/238
See application file for complete search history.

*Primary Examiner* — Adnan Mirza
(74) *Attorney, Agent, or Firm* — Christopher & Weisberg, P.A.

(57) ABSTRACT

In one embodiment, a method for interfacing between a command-line-interface (CLI)-based application program (CLI-AP) residing in a client network device, and remote network devices. The method includes predefining at least one CLI-based program routine (CLI-PR) comprising at least one CLI-based command wherein the CLI-PR is defined externally to the CLI-AP, determining by CLI-AP a set of data to be obtained from the remote network device; selecting by CLI-AP a predefined CLI-PR from the predefined CLI-PRs, the selected predefined CLI-PR corresponding to the remote network device and determined set of data to be obtained; instructing the client network device by CLI-AP to execute the selected predefined CLI-PR, wherein executing selected predefined PR will cause the selected predefined CLI-PR to obtain the determined set of data from remote network device and to configure the obtained data in a predetermined format; and querying configured data by CLI-AP to retrieve the determined set of data.

17 Claims, 4 Drawing Sheets

US 8,417,803 B2

INTERFACING BETWEEN A COMMAND LINE INTERFACE-BASED APPLICATION PROGRAM AND A REMOTE NETWORK DEVICE

CROSS-REFERENCE TO RELATED APPLICATIONS

This application is a continuation based upon and claims the benefit of priority from U.S. patent application Ser. No. 12/732,043, now U.S. Pat. No. 8,161,140, which is based upon and claims the benefit of priority from U.S. patent application Ser. No. 11/265,759, now U.S. Pat. No. 7,707,269.

FIELD

Embodiments of the invention relate to managing network devices. More particularly, embodiments of the present invention are directed to a system and method for interfacing between a device/network management application program and a remote network device that exposes a command line interface (CLI).

BACKGROUND

Computer networks, such as the Internet, are in widespread use today. These networks feature interconnected network devices, such as switches or routers, or computers, with some providing interfaces for users (persons) to communicate or interact or manage them. For instance, such interaction could be performed across a network by providing a network device with lines of textual commands, such as a sequence of alphanumeric characters, from either a keyboard or from a script. This method is commonly referred to as a command line interface (CLI) method. The "CLI" term is usually used in contrast to a graphical user interface (GUI) in which commands are typically issued by moving a pointer such as a mouse cursor and then pressing a key mounted on the mouse, commonly referred to as 'clicking the mouse'. Remote CLI interactions are typically carried over a Telnet or a secure shell (SSH) protocol.

In a typical CLI scenario, a program residing in the computer system (local or remote) for which the CLI command is intended, directly or indirectly accepts and carries out the entered command line input. The result is a textual output signifying the initialization and running of some program, or some change in a system such as data deletion, modification or creation, etc.

The use of CLI, while effective for human interaction, is not without shortcomings from a network management standpoint. The most commonly used device management method is SNMP protocol, though there are other methods for managing or interacting with network devices. Some network devices, however, only expose the CLI interface in the form of Telnet and/or a SSH, and as such presents the data in a "decorated" form, where the data itself is intermixed with human-readable text. This form of data presentation, while useful for a human operator, complicates automated meaningful data collections. This results in the majority of CLI interaction code within network devices to become text parsing to extract the desired data values from the CLI, thus detracting from the original purpose of interacting between devices to collect device data, configure device with new data, or a combination thereof. The inclusion of text parsing in an application program also adds significant overhead in the time and expenses associated with the development of CLI-interaction application programs, as well as with their updating or upgrading at a future date.

Accordingly, there is a need for reducing the overhead associated with text-parsing within CLI-interaction application programs as well as the time and expenses in the development of CLI-interaction application programs.

SUMMARY

This invention can be regarded as, a program routine execution layer external to a command line interface (CLI)-based application program and adapted to provide an interface between the CLI-based application program and a remote network device. The program routine execution layer is further adapted to: receive at least one predefined CLI-based command selected by the CLI-based application program, the predefined CLI-command defined externally to the CLI-based application program; transmit the received at least one predefined CLI-based command to the remote network device to obtain data corresponding to the remote network device; receive a CLI-based response from the remote network device wherein the CLI-based response includes the data corresponding to the remote network device; extract a subset of the received data from the CLI-based response based on predetermined instructions; and reconfigure the extracted subset of data into a predetermined format, wherein the CLI-based application program is adapted to query the reconfigured extracted subset of data to obtain the data corresponding to the remote network device This invention can also be regarded as a method of providing an interfacing between a command line interface (CLI)-based application program residing in a client network device, and a remote network device. The method includes executing a predefined CLI-based program routine defined externally to the CLI-based application program and dynamically selected by the CLI-based application program, the predefined CLI-based program routine comprising at least one predefined CLI-based command. The executing the predefined CLI-based program routine includes transmitting at least one predefined CLI-based command corresponding to the executed CLI-based program routine to the remote network device to obtain data corresponding to the remote network device, receiving a CLI-based response from the remote network device wherein the CLI-based response includes the data corresponding to the remote network device, and extracting a subset of the received data from the CLI-based response based on predetermined instructions. The method further includes reconfiguring the extracted subset of data into a predetermined format; and querying the reconfigured extracted subset of data by the CLI-based application program to obtain the requested data corresponding to the remote network device.

This invention can also be regarded as a method for interfacing between a command line interface (CLI)-based application program residing in a client network device, and remote network devices. The method includes predefining at least one CLI-based program routine comprising at least one CLI-based command wherein the at least one predefined CLI-based program routine is defined externally to the CLI-based application program; determining by the CLI-based application program a set of data to be obtained from the remote network device; selecting by the CLI-based application program a predefined CLI-based program routine from the at least one predefined CLI-based program routine, the selected predefined CLI-based program routine corresponding to the remote network device and the determined set of data to be obtained; instructing the client network device by the CLI-based application program to execute the selected predefined CLI-based program routine, wherein executing the selected predefined CLI-based program routine will cause the selected predefined CLI-based program routine to obtain the determined set of data from the remote network device and to configure the obtained data in a predetermined format; and querying the configured data by the CLI-based application program to retrieve the determined set of data.

DETAILED DESCRIPTION OF THE INVENTION

Embodiments of the invention generally relate to methods for interfacing between a command line interface-based application program and a remote network device. Herein, the invention may be applicable to a variety of wired and/or wireless networks such as a local area network (LAN), wide area network (WAN) such as the Internet and the like.

Certain details are set forth below in order to provide a thorough understanding of various embodiments of the invention, albeit the invention may be practiced through many embodiments other than those illustrated. Well-known logic and operations are not set forth in detail in order to avoid unnecessarily obscuring this description.

In the following description, certain terminologies are used to describe features of the invention. A network device as used through out the detailed description refers to any device that is connected to a network and capable of communicating or interacting with other devices on the network. Examples of network devices include, but are not limited or restricted to a server, computer, personal digital assistant (PDAs), voice-over-IP (VoIP) telephone, or the like. The term "client network device" as used through out the detailed description includes any device adapted to process data and to query a remote network device for information about the network device. A "remote network device" as used through out the detailed description is any device adapted to expose information about itself on a per request basis. Examples of remote network devices include, but are not limited or restricted to a switch, a server, a router or the like. It should be noted that a given network device may have the associated hardware and software to function in the capacity of both a client network device and a remote network device, so that in one capacity it can function as a server to expose information about itself on a per request basis but in another capacity it can also function as a client network device in querying a network device remote to the client network device for information about that remote network device.

The term "software" generally denotes executable code such as an operating system, an application, an applet, a routine or even one or more instructions. The software may be stored in any type of memory, namely suitable storage medium such as a programmable electronic circuit, a semi-conductor memory device, a volatile memory (e.g., random access memory, etc.), a non-volatile memory (e.g., read-only memory, flash memory, etc.), a floppy diskette, an optical disk (e.g., compact disk or digital versatile disc "DVD"), a hard drive disk, tape, or any kind of interconnect being a physical medium used to transport information.

Figure 1:
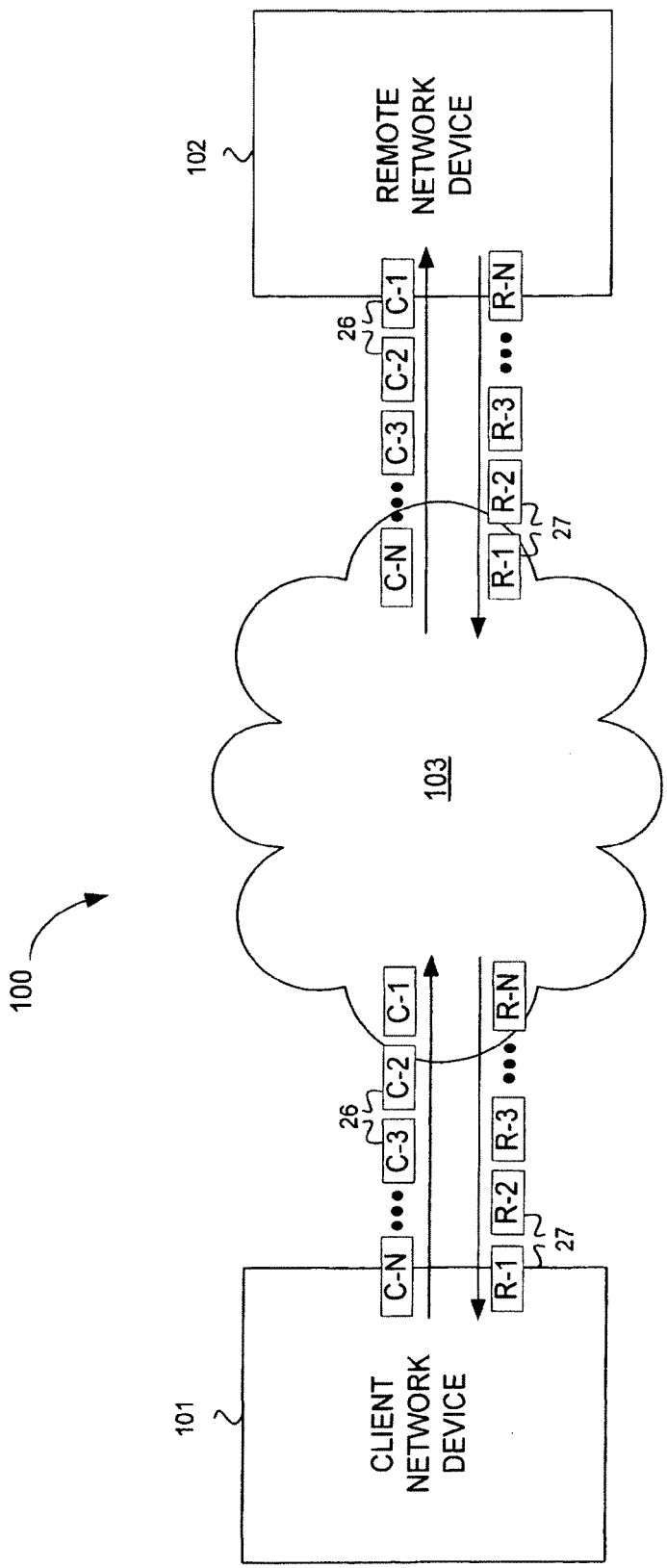
FIG. 1 is an exemplary network environment in which the present invention may be practiced.

With reference to FIG. 1, an exemplary network environment 100 is shown in which the present invention may be practiced. As shown in FIG. 1, the network environment 100 includes a command line interface (CLI)-based client network device 101, such as a management station, which communicates via the network 103 with a remote CLI-based network device 102, such as a managed station. As described above, interactions between CLI-based network devices 101 and 102 are performed by providing a calling application program in the client network device 101 with CLI-based commands 26, such as a sequence of alphanumeric characters, from either a keyboard or from a script. These CLI-based commands 26, such as C-1 through C-N (N>1), are then transmitted via the network 103 to a remote network device 102 which accepts and carries out the entered commands 26. The result is one or more CLI-based responses 27, such as R-1 through R-N (N>1), that are then transmitted back to the client network device 101. The CLI-based responses 27 are textual output results of running of CLI-based commands 26.

As described above, in some CLI-based client network devices 101, the data in CLI-based responses 27 are presented to a calling application program running on the client network devices 101 in a "decorated" form, where the data itself is intermixed with human-readable text, which is useful for a human operator, but complicates automated meaningful data collections. This detrimentally results in the majority of CLI interaction code within a client network device 101 to become text parsing to extract the desired data values from the CLI-based responses 27.

Figure 2:
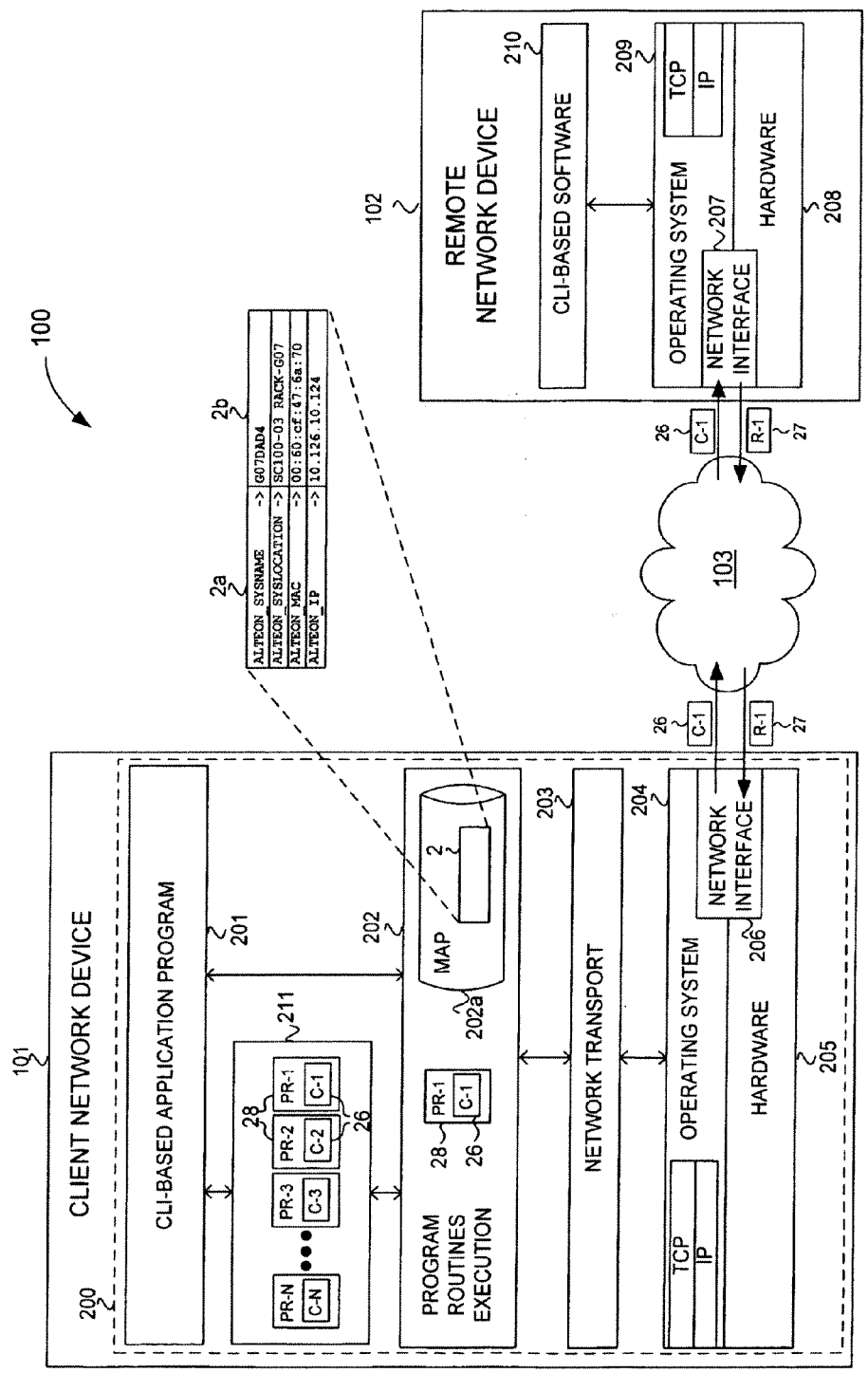
FIG. 2 is an illustration of a software stack for an embodiment of the present invention implemented in a network device of FIG. 1.

FIG. 2 is an illustration of a software stack 200 for an embodiment of the present invention implemented in the client network device 101, such as a managing network device, of FIG. 1. As shown in FIG. 2, the software stack 200 comprises a CLI-based application program layer 201 such as a CLI-interaction centric program layer, a CLI-based program routine execution layer 202 of the present invention that is external to the CLI-based application program layer 201, a network transport layer 203, such as a Telnet or secure shell layer (SSH), an operating system layer 204, and associated hardware layer 205 and a network interface 206. The CLI-based application program layer 201 interfaces with a CLI-based program routine execution layer 202 that is external to the CLI-based application program layer 201.

The program routine execution layer 202 of the present invention is adapted to be pluggable via CLI-based program routines 28, such as program scripts containing one or more set of CLI-based commands 26 along with instructions on how to process the responses to these CLI-based commands, and can thus be configured and modified independently from the calling application programs of the CLI-based application program layer 201. Suitably, the program routine execution layer 202 is adapted to receive the CLI-based program routines 28, such as PR-1, from the CLI-based application program layer 201 which in turn retrieves them from the storage 211 external to the CLI-based application program layer 201. Suitably, the program routine execution layer 202 is adapted to retrieve the CLI-based program routines 28, such as PR-1, from the storage 211 pursuant to a command received from the CLI-based application program layer 201. The program routine execution layer 202, such as a script library, hosts the logic capable of interpreting and executing the contents of the program routines 28 which pertain to a predefined format. The program routine execution layer 202 is also adapted to transmit the CLI-based commands 26 to the CLI-based network device 102 via network transport layer 203, operating system layer 204, and associated hardware layer 205 and network interface 206, as described below and in greater detail in conjunction with FIG. 3. The CLI-based commands 26 are then received in the network interface 207, the operating system layer 209, and associated hardware layer 208, and to ultimately arrive in the CLI-based software layer 210 of the remote network device 102. The remote network device 102 then issues a CLI-based response 27 that is ultimately received back in the program routine execution layer 202, and is processed according to the instructions defined in the program routine 28 to extract and store the data of interest.

Figure 3:
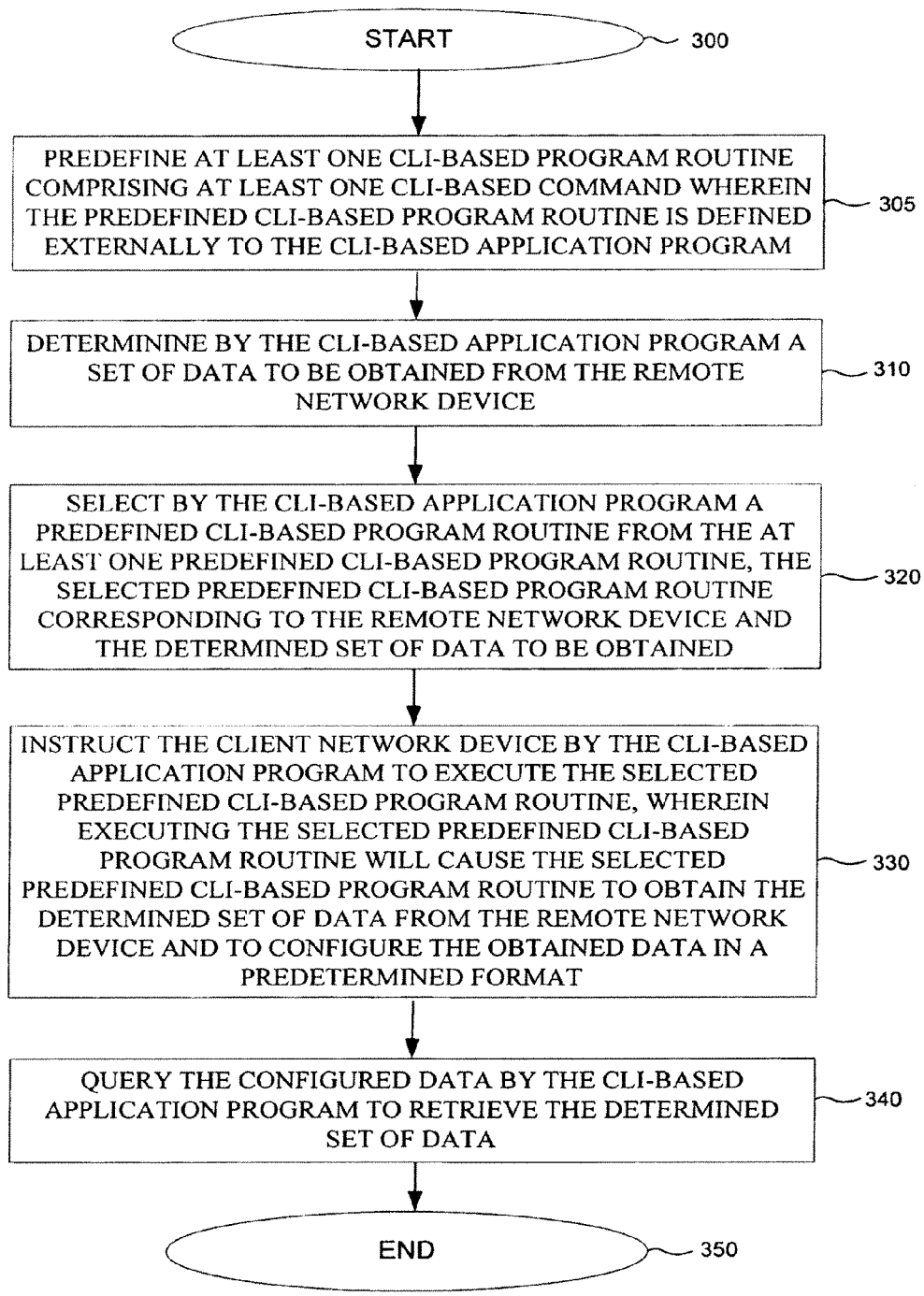
FIG. 3 is a flow diagram illustrating operations of an embodiment of the present invention.

The overall series of interfacing operations between the client network device 101 and remote network device 102 shown in FIG. 2 will now be discussed in greater detail in conjunction with FIG. 3. In the interest of simplicity, an exemplary set of CLI-based commands 26 such as C-1 through C-N (N>1), CLI-based responses 27 such as R-1 through R-N (N>1), and associated data are used throughout the specification, although the invention is not in anyway limited to the following examples. As shown in FIG. 3 and supplemented by the illustrations of FIG. 2, the process begins in block 300 and proceeds to block 305 in which at least one CLI-based program routine 28 comprising at least one CLI-based command 26 along with instructions on how to process the response to such CLI-based command is predefined. As shown in FIG. 2, the predefined CLI-based program routines 28 are defined externally to the CLI-based application program layer 201, suitably stored in a storage medium 211 such as main memory or cache, accessible by the CLI-based application program layer 201 or the CLI-based application program layer 201. Suitably, the predefined CLI-based program routines 28 are tailored to both the type of CLI-based remote network device 102 and the set of data to be obtained from that type. Different types of CLI-based remote network devices 102, or same types of CLI-based remote network devices 102 running different versions of CLI-based software 210, can expose the same or different set of data through different CLI-based commands 26.

Returning to FIG. 3, the process then flows to block 310 in which a calling application program in the CLI-based application program layer 201 determines the type of the remote network device 102 of FIG. 2 and the set of data to be obtained from the device. In the example used herein, the calling application program determines that the data to be obtained from the remote network device 102 are those pertained to the current System Status and Syslog notification registration information for an Alteon® switch. Next, in block 320, the calling application program selects a CLI-based program routine 28, such as PR-1, which is predefined to collect such data from an Alteon® device type. For simplicity of illustration on FIG. 2, the CLI-based program routines 28 are shown to each contain one CLI-based command 26, although multiple CLI-based command 26s can also be used in each of CLI-based program routine 28 and are contemplated to be within the scope of the present invention. The selected CLI-based program routine 28, such as PR-1, corresponds to the remote network device 102 and determines set of data to be obtained from the remote network device 102, which for the current example is the current System Status and Syslog notification registration information of the remote network device 102. Suitably, the CLI-based application program layer 201 is adapted to select a proper CLI-based program routine 28 such as PR-1 based on both the type of the remote network device it is interacting with and the set of data to be obtained from the selected remote network device, such as from the selected network device 102.

Next, in block 330, the calling application program in the CLI-based application program layer 201 instructs the client network device 101, such as the operating system 204 and associated hardware 205 to execute the selected CLI-based program routine 28 by means of Network Transport 203. As described below and in greater detail in conjunction with FIG. 4, executing the selected CLI-based program routine 28 will cause the selected CLI-based program routine 28 to obtain the determined set of data from the network device 102 and to configure the obtained data in a predetermined format, such as in a map format 202a which holds the obtained data values from device 102 under configured names, such as the data map 2.

Figure 4:
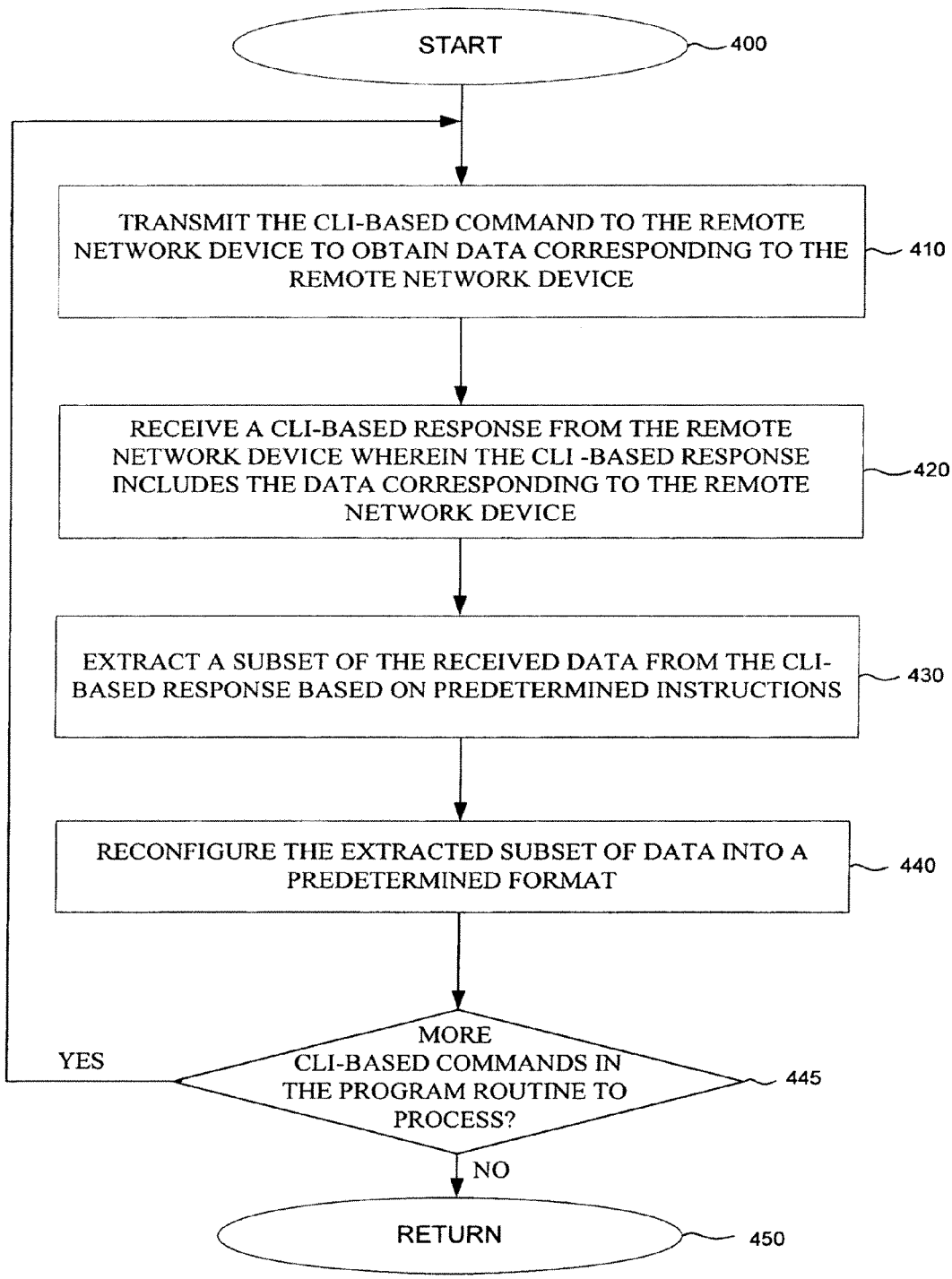
FIG. 4 is a flow diagram illustrating operations of another embodiment of the present invention.

FIG. 4 describes in greater detail the operations performed in block 330 of FIG. 3 for executing a CLI-based program routine 28 defined externally to the CLI-based application program layer 201. As shown in FIG. 4, the process begins in block 400 and proceeds to block 410 in which a CLI-based command 26 of FIG. 2, such as command C-1, corresponding to the selected CLI-based program routine 28, such as PR-1, is transmitted to the remote network device 102 to obtain the determined set of data corresponding to the remote network device 102. The command C-1 is transmitted via the network transport layer 203, which suitably contains a library of network transport software such as Telnet or SSH, to the network interface 206 by the operating system 204 and associated hardware 205. For the current example, the first CLI command C-1 defined by the CLI-based program routine 28 is "/cfg/sys/cur", which is an Alteon® switch specific CLI-based command 26 to cause the remote network device 102 to transmit the Current System Information in the expected format in its CLI-based response 27.

Next, in block 420, the above-described CLI-based response 27, such as R-1, is received from the remote network device 102. The "R-1" response includes the determined set of data corresponding to the network device 102. For example, upon a successful execution of the command C-1, such as "/cfg/sys/cur", an exemplary network device 102, such as an Alteon® switch, may send a CLI-based response 27 containing the current system status information that has the following format:

System Information at 17:39:32 Mon Mar. 14, 2005
    Alteon AD4
    sysName: GO7DAD4
    sysLocation: SC100-03 RACK-G07
    MAC address: 00:60:cf:47:6a:70 IP (If 1) address: 10.126.10.124
    Switch is up 283 days, 1 hour, 4 minutes and 12 seconds.
    Last boot: 16:25:05 Fri Jun. 4, 2004 (power cycle)
    Hardware Revision: B
    Hardware Part No: E04_5B-A_6B-A
    Software Version 10.0.25 (FLASH image1), active configuration.
    >>GO7DAD4-System#

Suitably, the CLI-based response 27 comprises at least one identifier data, such as a name, and at least one value data corresponding to the identifier data. In the above example, sysName is a named identifier data with a value data of G07DAD4 corresponding to sysName.

Next, in block 430, a subset of the received response data is extracted based on predetermined instructions. Suitably, the predetermined instructions are free-form text parsing Regular Expression (RE)-based instructions that are previously defined as part of CLI-based program routine 28 definitions for the received CLI response 27 to extract the subset of data from the CLI-based response 27. Suitably, a CLI-based response 27 is matched against custom-defined RE-based instructions for the expected response type. Upon a successful match, parts of the response text that are defined by the CLI-based program routine 28 as the set of data to be obtained from the network device 102 are extracted. For example applying a custom-defined RE-based pattern for the "/cfg/sys/cur" CLI-based command:

```
sysName:\s+(.+)\s*\nsysLocation:\s+(.+)\s*\n
MAC address:\s+(\S+)\s+IP.+address:\s+(\S+)\s*\n
``` to the above response extracts the sysName, SysLocation, the media access control (MAC) address and Internet Protocol (IP) address values of the network device 102 as its first, second, third and fourth matches correspondingly.

Next, in block 440, the extracted subset of data is reconfigured in a predetermined data structure format, such as in the data map format 202a which stores the extracted data parts under configured names, such as a map 2, and maintained and managed by program routine execution layer 202 and stored locally in a storage medium in the network device 101, such as in main memory or cache (not shown). The map 2 is accessible by the calling CLI-based application program layer 201 via the program routine execution layer 202. Suitably, the map format 202a comprises a named-value format with at least one map entry for each identifier data and value data corresponding to the identifier data. Suitably, the predetermined instructions include formatting instruction for configuring the map format 202a, such as in the below exemplary extract and format instructions:

```
<pattern-page id=" Alteon_System_Info">
  <pattern-paragraph type="flat">
    <pattern>
      <pattern-string>
        <![CDATA[(sysName:\s+(.+)\s*\nsysLocation:\s+(.+)\nMAC
address:\s+(\S+)\s+IP.+address:\s+(\S+)\s*\n)]]>
      </pattern-string>
      <value-map>
        <value index="1" key-name="ALTEON_SYSNAME"/>
        <value index="2" key-name="ALTEON_SYSLOCATION"/>
        <value index="3" key-name="ALTEON_MAC"/>
        <value index="4" key-name="ALTEON_IP"/>
      </value-map>
    </pattern>
  </pattern-paragraph>
</pattern-page>
```

Applying the above exemplary extract and format instructions to the CLI-based response 27 data results in the following exemplary named-value map 2 (as also shown in FIG. 2):

```
ALTEON_SYSNAME    -> G07DAD4
ALTEON_SYSLOCATION -> SC100-03 RACK-G07
ALTEON_MAC        -> 00:60:cf:47:6a:70
ALTEON_IP         -> 10.126.10.124
``` where each map entry uses a named identifier key field 2a as defined in the "key-name" attributes of the <value-map> structure to give a name to the value data field 2b having stored therein a value data corresponding to the identifier key. The assignment of data parts to the preconfigured names is done based on a match index as predetermined by command lines of the form <value index="n" key-name="SOME-KEY-NAME">. For example the first match by the RE-based instructions is assigned the name of ALTEON_SYSNAME, the second is assigned the name of ALTEON_SYSLOCATION and so on. The first entry in map 2 includes a named ALTEON_SYSNAME identifier data stored in the named identifier data field 2a, and a value data G07DAD4 corresponding to the named ALTEON_SYSNAME identifier data stored in the value data field 2b.

Next, the flow proceeds to decision box 445 in which it is determined if there are more CLI-based commands 26 in a CLI-based program routine 28 to process, if the there are not more CLI-based commands 26 in a CLI-based program routine 28 to process, then flow proceeds to block 450 for returning to block 330 of FIG. 3. If there are more CLI-based commands 26 in a CLI-based program routine 28 to process then the flow returns to block 410 for processing of a subsequent CLI-based commands 26. The processes of blocks 410-445 continues until all the CLI-based commands 26 in a CLI-based program routine 28 are executed.

For example, if in block 445 it is determined that a second CLI-based command 26, such as "/cfg/sys/syslog/cur" exists in the PR-1 (as in the current example), the "/cfg/sys/syslog/cur" command is executed in the manner described above in conjunction with the CLI-based C-1 and a CLI-based R-2 response 27 is then received from the network device 102, such as in the following exemplary CLI-based R-2 response 27:

```
Current syslog configuration:
  host 134.177.123.250, severity 7, host2 10.127.8.23, severity2 4,
console enabled
  syslogging all features
>> G07DAD4 - Syslog#
```

A subset of the received current system log configuration data is then extracted, such as based on the following predetermined RE-based extract and format instructions:

```
<pattern-page id="Alteon_Syslog_info">
  <pattern-paragraph type="flat">
    <pattern>
      <pattern-string>
        <![CDATA[(host (.*), severity (.*), host2 (.*),
severity2 (.*), console (\S+).*)]]>
      </pattern-string>
      <value-map>
        <value index="1" key-name="ALTEON_SYSLOG_HOST"/>
        <value index="2"
key-name="ALTEON_SYSLOG_SEVERITY"/>
        <value index="3" key-name="ALTEON_SYSLOG_HOST"/>
        <value index="4"
key-name="ALTEON_SYSLOG_SEVERITY"/>
        <value index="5"
key-name="ALTEON_SYSLOG_CONSOLE"/>
    </pattern>
  </pattern-paragraph>
</pattern-page>
``` and stored under names defined in the RE-based extract and format instructions in a map format 202a. Suitably, the extracted information being a part of the same CLI-based program routine 28 are appended to the entries in the existing map 2, for ease of retrieval by the calling application program in the CLI-based application program layer 201, as shown below:

```
ALTEON_SYSNAME     -> G07DAD4
ALTEON_SYSLOCATION -> SC100-03 RACK-G07
ALTEON_MAC         -> 00:60:cf:47:6a:70
ALTEON_IP          -> 10.126.10.124
ALTEON_SYSLOG_HOST     -> [134.177.123.250, 10.127.8.23]
ALTEON_SYSLOG_SEVERITY -> [7, 4]
ALTEON_SYSLOG_CONSOLE  -> enabled
``` wherein the entries under names ALTEON_SYSLOG_HOST, ALTEON_SYSLOG_SEVERITY and ALTEON_SYSLOG_CONSOLE are the newly added entries. Suitably, each map 2 is generated and populated for one executed script only. Since one script can issue multiple CLI-based commands 26, the data collected from previous CLI-based commands 26 of the executing script is maintained by the map 2 and appended with the data from the execution of a current CLI-based command 26, as shown above. Once the script is executed the collected data map 2 is returned to the calling CLI-based application program layer 201. When another script is executed, however, a new map 2 is suitably created and populated in the above manner, as the new script executes.

To complete the example, the entire PR-1 used in the example is shown below:

```
<?xml version="1.0" encoding="UTF-8"?>
<!DOCTYPE cli-program SYSTEM "clicommprog.dtd">
<cli-program id="Alteon_Syslog"
        transport="telnet"
        device-type="Alteon">
 <pattern-pages>
  <pattern-page id="Alteon_System_Info">
    <pattern-paragraph type="flat">
     <pattern>
      <pattern-string>
        <![CDATA[(sysName:\s+(.+)\s*\nsysLocation:\s+(.+)\nMAC address:\s+(\S+)\s+IP.+address:\s+(\S+)\s*\n)]]>
      </pattern-string>
      <value-map>
        <value index="1" key-name="ALTEON_SYSNAME"/>
        <value index="2" key-name="ALTEON_SYSLOCATION"/>
        <value index="3" key-name="ALTEON_MAC"/>
        <value index="4" key-name="ALTEON_IP"/>
      </value-map>
     </pattern>
    </pattern-paragraph>
  </pattern-page>
  <pattern-page id="Alteon_Syslog_info">
    <pattern-paragraph type="flat">
     <pattern>
      <pattern-string>
        <![CDATA[(host (.*), severity (.*), host2 (.*), severity2 (.*), console (\S+).*)]]>
      </pattern-string>
      <value-map>
        <value index="1"
         key-name="ALTEON_SYSLOG_HOST"/>
        <value index="2"
         key-name="ALTEON_SYSLOG_SEVERITY"/>
        <value index="3"
         key-name="ALTEON_SYSLOG_HOST"/>
        <value index="4"
         key-name="ALTEON_SYSLOG_SEVERITY"/>
        <value index="5"
         key-name="ALTEON_SYSLOG_CONSOLE"/>
      </value-map>
     </pattern>
    </pattern-paragraph>
  </pattern-page>
 </pattern-pages>
```
-continued
```
 <cli-commands>
  <cli-command id="Alteon_System_Info_Cmd"
        command="cfg/sys/cur">
    <response pattern-page-ref="Alteon_System_Info"
        done-pattern=" - System#"/>
  </cli-command>
  <cli-command id="Alteon_Syslog_Info_Cmd"
        command="cfg/sys/syslog/cur">
    <response pattern-page-ref="Alteon_Syslog_Info"
        done-pattern=" - Syslog#"/>
  </cli-command>
  <cli-command id="Alteon_Exit_Cmd" command="exit">
  </cli-command>
 </cli-commands>
 <cli-batch-commands id="Alteon_Collect_Syslog_Info">
  <cli-batch-command id-ref="Alteon_Syslog_Info_Cmd"/>
  <cli-batch-command id-ref="Alteon_Syslog_Info_Cmd"/>
  <cli-batch-command id-ref="Alteon_Exit_Cmd"/>
 </cli-batch-commands>
</cli-program>
```

When a CLI-based program routine 28 executes, the instruction commands defined in <cli-batch-commands> section of the program routine 28 are ones iterated over in block 445 of FIG. 4. Each <cli-batch-command> is referring to the one of the defined <cli-command> in the <cli-commands> section. Each <cli-command> defines an actual CLI-based command 26 to be issued to the remote network device 102 in its "command" attribute. The <response> part of <cli-command> defines the way a CLI-based response 27 is processed. The "pattern-page-ref" attribute defines patterns and instructions to be applied to the CLI-based response 27 to extract the data. Such patterns are defined in the <pattern-pages> section and follow the format described above in the example presented.

So far the responses containing "flat" (i.e. non-repeating) data has been illustrated. For the repeating data layout CLI-based responses 27 a slightly different approach is used. For example consider a CLI-based response 27 by Contivity® switch to a CLI-based command 26 "show syslog-host" in the enable mode:

| Status | Host | Level | Filter-Facility | Tagged-Facility | Port |
|---|---|---|---|---|---|
| Enabled | 134.177.123.220 | ALL | ALL | KERN | 514 |
| Enabled | 134.177.222.78 | 7 | ALL | KERN | 514 |
| Disabled | | ALL | ALL | KERN | 514 |
| Disabled | | ALL | ALL | KERN | 514 |

The corresponding parsing instructions definition could be:

```
<pattern-page>
 <pattern-paragraph type="repeating">
  <pattern type="table-row">
    <pattern-string>
      <![CDATA[(\s*(?:Enabled|Disabled).+ \n)]]>
    </pattern-string>
    <field-widths>
      <field-width index="1" key-name="STATUS"
          width="10" trim="true"/>
      <field-width index="2" key-name="HOST"
          width="16" trim="true"/>
      <field-width index="3" key-name="LEVEL"
          width="9" trim="true"/>
      <field-width index="4" key-name="FILTER_FACILITY"
          width="18" trim="true"/>
```

```
            <field-width index="5" key-name="TAGGED_FACILITY"
                width="18" trim="true"/>
            <field-width index="6" key-name="PORT"
                width="6" trim="true"/>
        </field-widths>
    </pattern>
  </pattern-paragraph>
</pattern-page>
```

By defining a <pattern-paragraph> as "repeating" and defining a pattern that matches on one such data repetition, every repeating part of the response can be isolated and processed individually and independently of other repeating parts. In the example above, the field-width approach is used, whereas the response is a tabular data with fixed field widths. The table rows are matched and parsed one at a time based on the defined width of the fields. The resulting named value map may look as the following:

```
STATUS         -> [Enabled, Enabled, Disabled, Disabled]
HOST           -> [134.177.123.220, 134.177.222.78, , ]
LEVEL          -> [ALL, 7, ALL, ALL]
FILTER_FACILITY -> [ALL, ALL, ALL, ALL]
TAGGED_FACILITY -> [KERN, KERN, KERN, KERN]
PORT           -> [514, 514, 514, 514]
```

Repeating data responses may not be in a tabular fixed-width field format. For example, a CLI-based response 27 to a CLI-based command 26 "rTraceRoute 10.127.47.6 10.127.91.22" may appear as:

20/10/05 14:34:47 LOG0006 VTM: rTraceRoute Report from set (10.127.47.6):

20/10/05 14:34:47 LOG0006 VTM: 1—10.127.47.1: 0 ms 0 ms 0 ms

20/10/05 14:34:47 LOG0006 VTM: rTraceRoute Report from set (10.127.47.6):

20/10/05 14:34:47 LOG0006 VTM: 2—10.127.46.1: 0 ms 10 ms 0 ms

20/10/05 14:34:47 LOG0006 VTM: rTraceRoute Report from set (10.127.47.6):

20/10/05 14:34:47 LOG0006 VTM: 3—10.127.91.9: 0 ms 0 ms 0 ms

20/10/05 14:34:47 LOG0006 VTM: rTraceRoute Report from set (10.127.47.6):

20/10/05 14:34:47 LOG0006 VTM: 4—10.127.91.22: 10 ms 10 ms 10 ms

20/10/05 14:34:47 LOG0006 VTM: rTraceRoute completed !

oam>

While the response contains repetitive data, it is not tabular.

One approach to automatically handling such responses is with the following pattern:

```
<pattern-page>
  <pattern-paragraph type="repeating">
    <row-pattern>
      <pattern-string>
        <![CDATA[(rTraceRoute Report from set.*\n.*\n)]]>
      </pattern-string>
    </row-pattern>
    <pattern>
      <pattern-string>
        <![CDATA[(rTraceRoute Report from set.*\n.*VTM:
(\d{1,2}) -- (\d{1,3}\.\d{1,3}\.\d{1,3}\.\d{1,3}): (\d{1,2})ms
(\d{1,2})ms (\d{1,2})ms)]]>
      </pattern-string>
      <value-map>
        <value index="1" key-name="HOP_NUMBER"/>
        <value index="2" key-name="HOP_HOST"/>
        <value index="3" key-name="HOP_TIME1"/>
        <value index="3" key-name="HOP_TIME2"/>
        <value index="3" key-name="HOP_TIME3"/>
      </value-map>
    </pattern>
  </pattern-paragraph>
</pattern-page>
```

Each repeating data is first isolated with a pattern defined in the <row-pattern> section and then each isolated section is treated as "flat" by applying the patterns defined in the <pattern> section. The resulting map 2 upon execution of the a CLI-based program routine 28 may contain the following values

HOP_NUMBER→[1, 2, 3, 4]

HOP_HOST→[10.127.47.1, 10.127.46.1, 10.127.91.9, 10.127.91.22]

HOP_TIME1→[0, 0, 0, 10]

HOP_TIME2→[0, 10, 0, 10]

HOP_TIME3→[0, 0, 0, 10]

<pattern-page> elements are subdivided into <pattern-paragraph>s to be able to handle cases when the response is a combination of flat and repeating data or a sequence of repeating sections which are not alike. s are defined and process sequentially to reflect the expected CLI-based response 27 layout.

Returning to FIG. 3, following the execution of the selected program routine 28 as described above in block 330, the flow then proceed to block 340 in which the calling CLI-based application program layer 201 can then query the configured data, such as in map 2, to retrieve the determined set of data. As described above, the identifier data in the identifier field 2a suitably comprises a name and the calling CLI-based application program layer 201 queries the map 2 based on the name of the identifier data. Suitably, the program routine execution layer 202 is further adapted to dynamically load the CLI-based program routine 28 and to store and maintain the maps 2, and CLI-based application program layer 201 is adapted to query the data library via library calls and use the data in its application logic. Following the operations in block 340, the flow then proceeds to block 350 in which the overall process ends.

It should be noted that a number of CLI-based program routines 28, such as PR-1 through PR-N, may be sequentially selected by the calling CLI-based application program layer 201 in which case the foregoing processes described in blocks 310-340 of FIG. 3 may be repeated in the above-described manner for each of the selected program routine scripts 28. Suitably, each map 2 is generated and populated for one executed CLI-based program routine 28 only. Since one CLI-based program routine 28 can issue multiple CLI-based commands 26, the data collected from previous CLI-based commands 26 of the executing CLI-based program routine 28 is maintained by the map 2 and appended with the data from the execution of a current CLI-based command 26, as shown above. Once the CLI-based program routine 28 is executed, the collected data map 2 is returned to the calling CLI-based application program layer 201. When another CLI-based program routine 28 is executed, however, a new map 2 is suitably created and populated in the above manner, as the new CLI-based program routine 28 executes.

One advantage of the foregoing feature of the present invention over the prior art is that by having an externally defined CLI-based program routines 28 that are dynamically loaded and provided to a program routine execution layer 202, the overheads in the CLI-based application program layer 201 associated with the free-form text parsing to extract the desired data values from the a CLI-based response 27 are reduced. This is because text parsing by the calling CLI-based application program layer 201 is now suitably replaced with simple calls to a data library of scripts and maps in the program routine execution layer 202, which is configured externally and independently of the calling application's program logic. In addition, since both the program routine execution layer 202 and the CLI-based program routines 28 are external to the calling CLI-based application program layer 201 they can be modified independently from the calling application program. This renders the CLI-based application program layer 201 that uses the program routine execution layer 202 of the present invention more configurable, pluggable, and extendable, thus reducing the overheads in the time and expenses associated with the development of CLI-based application programs, as well as in providing dynamic support with their updating or upgrading at a future date. In addition to the advantages of reducing the overhead associated with direct CLI-based response parsing by the CLI-based application program layer 201, the present invention enhances the adaptability of CLI-based application programs to the changes in the remote network device CLI-based software layer 210 which might introduce different layouts, contents or the combination of the above in its CLI-based responses 27.

It should be noted that the various features of the foregoing embodiments were discussed separately for clarity of description only and they can be incorporated in whole or in part into a single embodiment of the invention having all or some of these features. It should further be noted that the present invention is not limited to network devices but can be readily used in conjunction with virtually any device or components of such device which communicates with other components of the same or different devices using busses or other medium of communication well known in the art.

What is claimed is:

1. A method of operating a client network device, the client network device comprising a command line interface (CLI)-based application program and a program routine execution layer external to the CLI-based application program, the program routine execution layer being configured to provide an interface between the CLI-based application program and a remote network device, the method comprising operating the program routine execution layer:
   to receive at least one predefined CLI-based command selected by the CLI-based application program, the predefined CLI-based command defined externally to the CLI-based application program;
   to transmit the received at least one predefined CLI-based command to the remote network device to obtain data corresponding to the remote network device;
   to receive a CLI-based response from the remote network device wherein the CLI-based response includes the data corresponding to the remote network device;
   to extract a subset of the received data from the CLI-based response based on predetermined instructions; and
   to reconfigure the extracted subset of data into a predetermined format that enables the CLI-based application program to query the reconfigured subset of data to obtain the data corresponding to the remote network device, the predetermined format comprising at least one identifier, a map entry corresponding to each identifier, and at least one value corresponding to each identifier.

2. The method of claim 1, comprising operating the CLI-based application program to select the predefined CLI-based command from a plurality of CLI-based commands and instructing the client network device to execute the selected CLI-based command.

3. The method of claim 1, wherein the predetermined instructions are previously defined for the received CLI-based response to extract the subset of data from the CLI-based response.

4. The method of claim 3, wherein the predetermined instructions are Regular Expression (RE)-based instructions.

5. The method of claim 1, wherein the extracted subset of data comprises a map format comprising at least one map entry corresponding to each identifier and at least one value corresponding to each identifier.

6. The method of claim 5, wherein the map format comprises an identifier key field corresponding to the each map entry.

7. The method of claim 1, comprising operating the program routine execution layer to store the reconfigured extracted subset of data in a storage medium accessible by the CLI-based application program.

8. The method of claim 7, comprising:
   operating the program routine execution layer to dynamically load the CLI-based command indicated by the CLI-based application program; and
   operating the CLI-based application program to query the program routine execution layer via library calls.

9. The method of claim 7, comprising operating the program execution layer to dynamically load the CLI-base command indicated by the CLI-base application program.

10. The method of claim 1, wherein the at least one predefined CLI-based command sent by the client network device contains information sufficient to enable the remote network device to expose information corresponding to the remote network device.

11. The method of claim 1, wherein the remote network device comprises at least one of a server, a router, and a switch.

12. The method of claim 1, comprising querying the reconfigured extracted subset of data by the CLI-based application program to obtain the data corresponding to the remote network device.

13. The method of claim 12, further comprising defining the predetermined instructions prior to executing the program routine.

14. The method of claim 12, wherein the extracted subset of data comprises at least one identifier data and at least one value data corresponding to the identifier data and wherein reconfiguring the extracted subset of data into the predetermined format further comprises:
   storing the extracted subset of data under predetermined keys; and
   mapping the extracted subset of data wherein the mapping comprises at least one map entry for each identifier data and a value data corresponding to the identifier data.

15. The method of claim 12, further comprising:
   selecting the predefined CLI-based program routine from a plurality of CLI-based program routines defined externally to the CLI-based application program; and
   instructing the client network device to execute the selected program routine.

16. The method of claim 1, wherein the (CLI)-based application program interfaces with a plurality of remote network devices.

17. The method of claim 16, comprising:
   predefining at least one CLI-based program routine comprising at least one CLI-based command wherein the CLI-based program routine is defined externally to the CLI-based application program;

selecting a remote network device from the plurality of remote network devices;

determining a set of data to be obtained from the selected remote network device;

selecting a predefined CLI-based program routine from the at least one predefined CLI-based program routine, the selected predefined CLI-based program routine corresponding to the remote network device and the determined set of data to be obtained;

operating the CLI-based application program to instruct the client network device to execute the selected predefined CLI-based program routine, wherein executing the selected predefined CLI-based program routine causes the selected predefined CLI-based program routine to obtain the determined set of data from the selected remote network device and to configure the obtained data in a predetermined format; and querying the configured data to retrieve the determined set of data.

* * * * *